Feb. 27, 1934.                A. P. BUQUOR                 1,949,352
                              GUN CARRIAGE
                          Filed Dec. 17, 1932          6 Sheets-Sheet 1

Inventor
Adolph P. Buquor
By
Attorneys

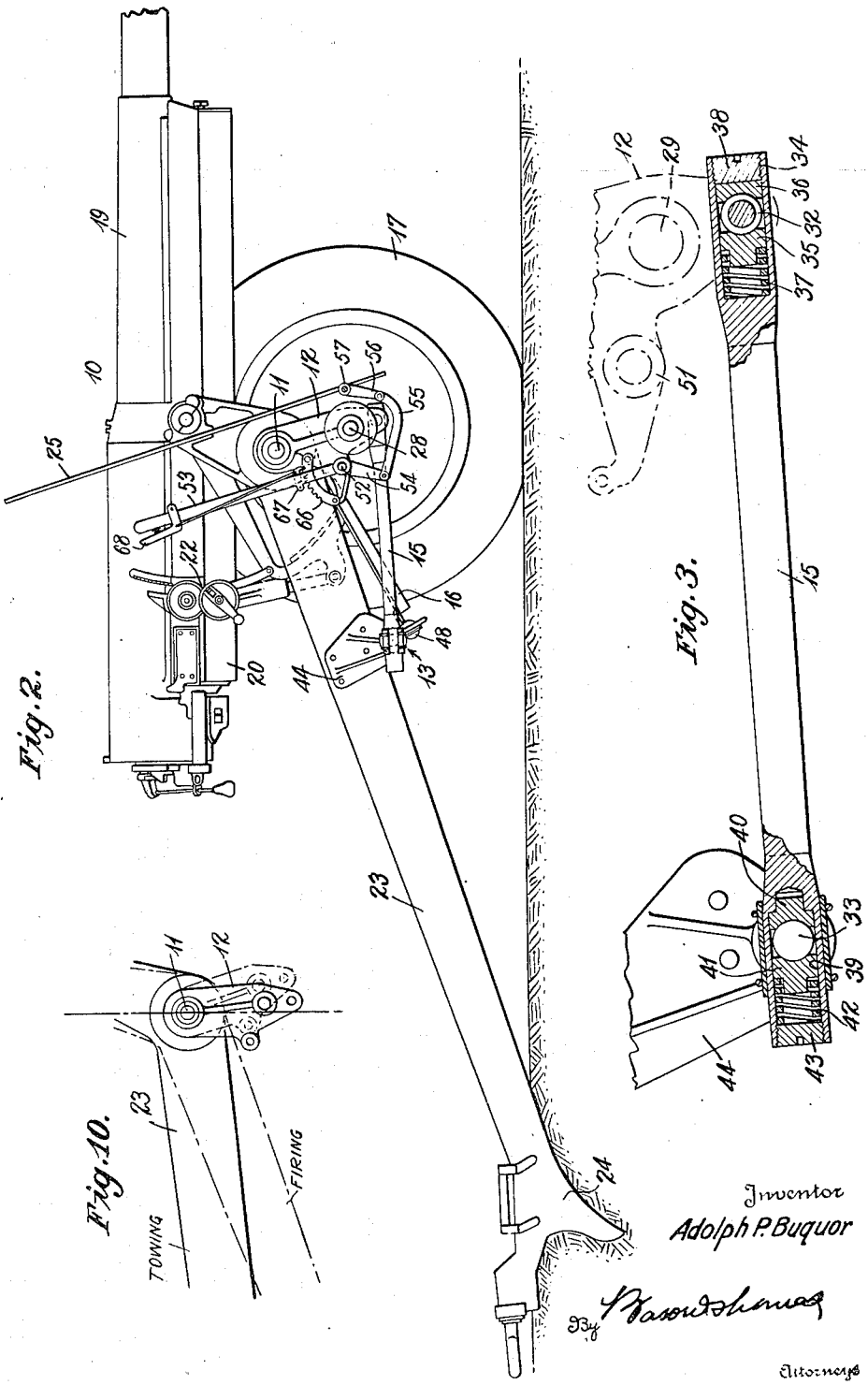

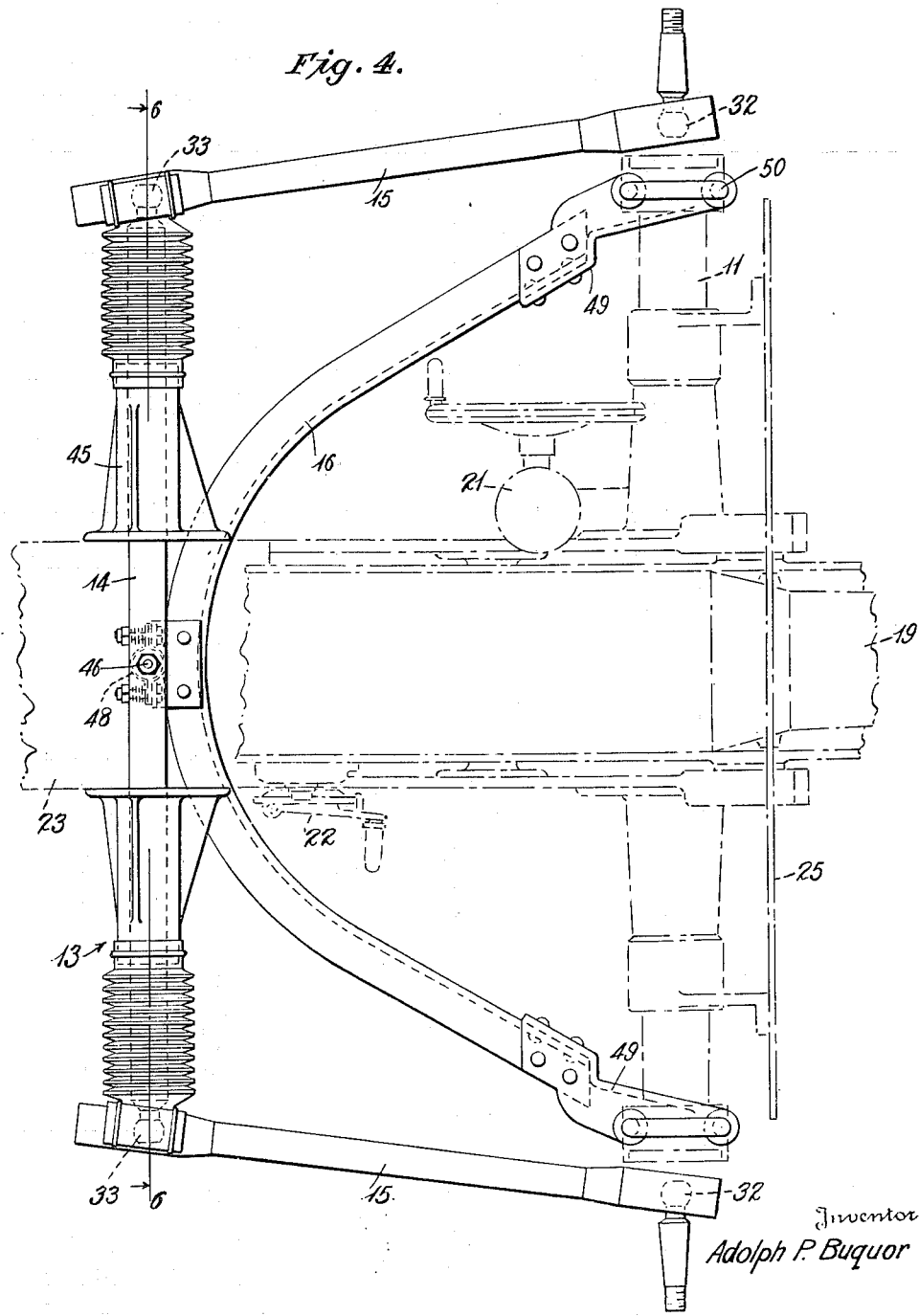

Feb. 27, 1934. A. P. BUQUOR 1,949,352
GUN CARRIAGE
Filed Dec. 17, 1932 6 Sheets-Sheet 4
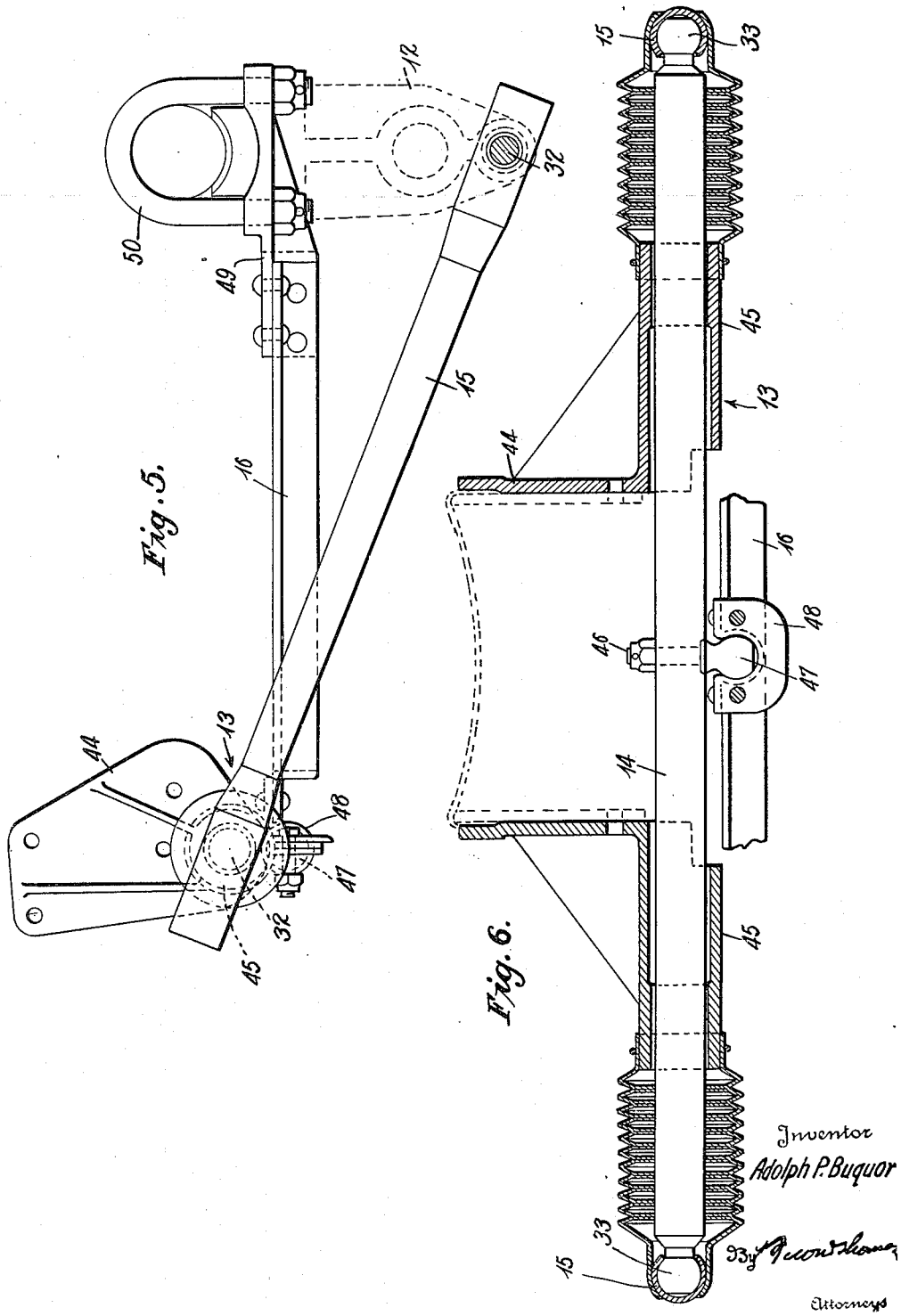

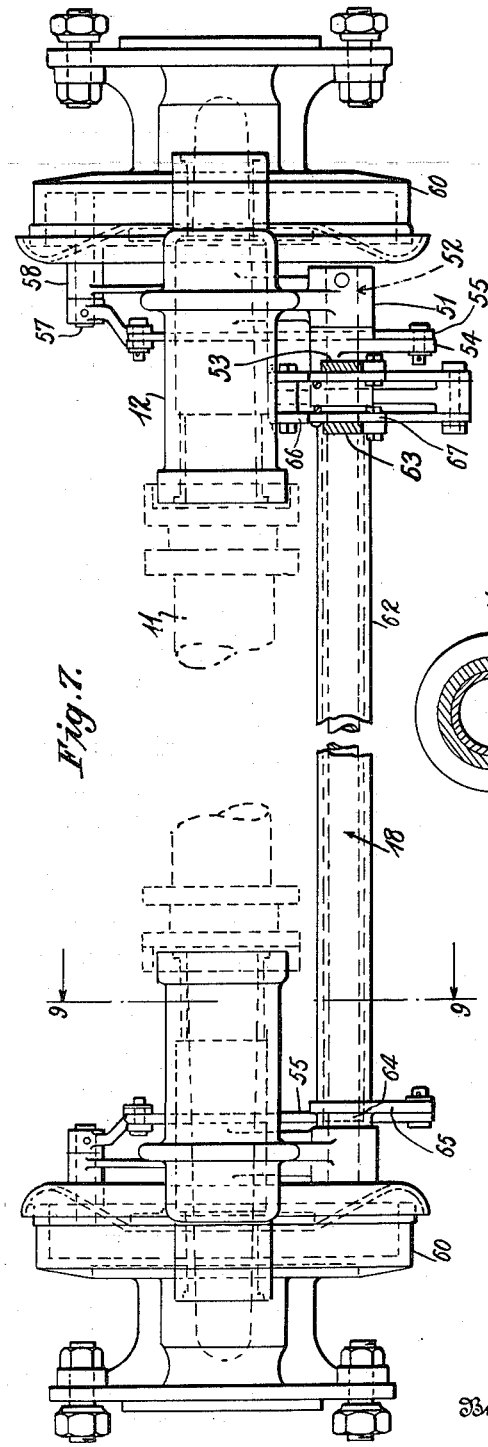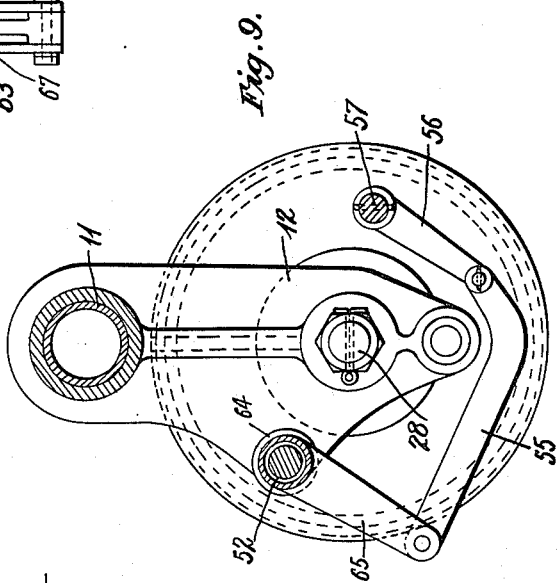

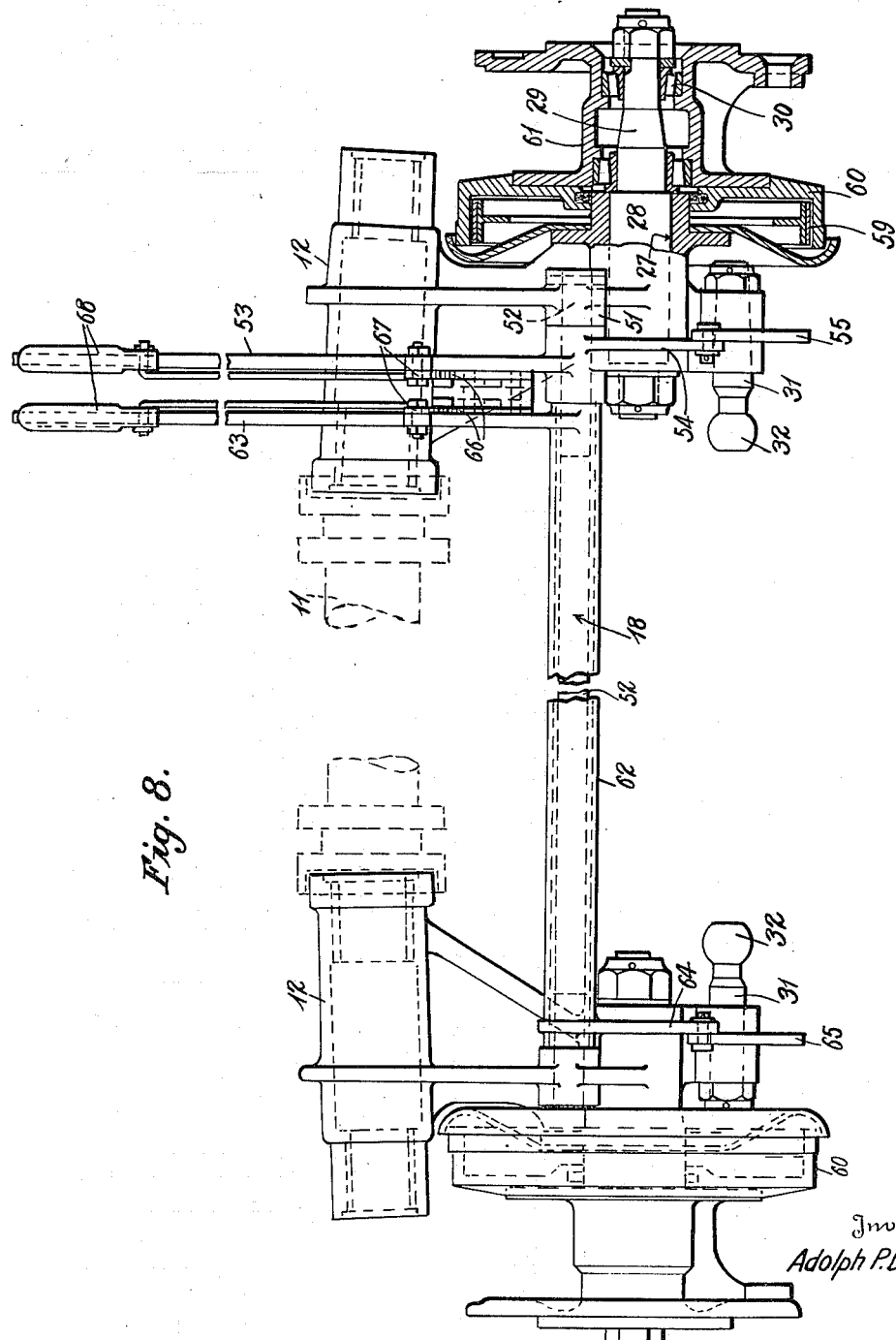

Patented Feb. 27, 1934

1,949,352

UNITED STATES PATENT OFFICE 1,949,352

GUN CARRIAGE

Adolph P. Buquor, York, Pa., assignor to Martin-Parry Corporation, York, Pa., a corporation of Delaware Application December 17, 1932
Serial No. 647,822

20 Claims. (Cl. 89—40)

This invention relates to gun carriages and particularly to gun carriages which are adapted for high speed transportation and easy wheeling and which are also adapted for supporting the gun during firing.

At the present time the Government of the United States has in its possession some thousands of slow moving horse-drawn guns of the type generally known as the French 75 mm. While these guns are satisfactory in operation, they have no practical utility for modern warfare for many reasons, including, for instance, the fact that the artillery wheels thereon render them incapable of a speed of more than twelve miles per hour without pounding themselves to pieces and also damaging the gun equipment. Furthermore, the wheels become defective by drying out and become loose in both the hub and the felloe. For practical purposes, therefore, these guns must be transported on motor vehicles and removed therefrom at the place of combat, which is awkward and tedious, involving considerable man-power and also involving considerable expensive conveying equipment.

One of the objects of the present invention is to convert this type of gun into an easy-wheeling, high-speed gun which has a speed of between thirty-five and sixty miles per hour.

Another object of the invention is to provide a gun carriage equipped with high speed rubber tired wheels which are adapted to absorb the road shocks incident to high speed transport and which is arranged to permit the firing of the gun while supported on the rubber tired wheels, without displacement of the gun and consequent misalignment thereof due to rebound from the rubber tires and which produces a carriage of adequate stability in firing, accuracy and ease of handling.

Another object of the invention resides in the provision of a high speed gun carriage which is equipped with flexibly tired wheels and which will absorb the recoil of the gun without causing such wheels to be lifted from the ground so that the gun returns to the original line of sight after each discharge thereof.

Another object of the invention is to provide a device whereby high speed rubber tired wheels may be successfully substituted for the artillery wheels conventionally used upon certain types of gun carriages.

Another object of the invention is to provide a replacement unit which enables wheels of smaller diameter to be used upon conventional gun carriages without modification of the essential portions of the gun carriage, without changing the height of the axle and without substantially increasing the weight of the gun carriage.

Another object of the invention is to provide a structure wherein the axles of the rubber tired wheels are disposed below the axle of the gun and are permitted limited relative movement with respect to the gun axle.

Another object resides in the provision of resilient impact-absorbing means which does not interfere with the operation of the gun for maintaining the wheel axles in position below the gun axle to assist in absorbing road shocks during transport and in absorbing a portion of the recoil of the gun during firing.

Another object of the invention is to provide a structure wherein the wheel axles are supported by depending arms substantially below and slightly forward of the center line of the gun axle when in transport position to prevent pounding action and are maintained at a fixed distance from the gun axle such that road shocks are largely absorbed by the rubber tires in combination with this construction. Moreover, the arms automatically advance forwardly a greater distance from the center line of the axle when the trail is imbedded in the ground for firing.

Another object of the invention is to provide an impact absorbing structure which will maintain the wheel axles below the gun axle, when the gun is disposed for firing, in such a position that the vertical components of the forces set up by the gun's recoil will be at least partially absorbed by the impact absorbing structure whereby to minimize bouncing on the rubber tires.

More specifically the invention comprehends the provision of a pair of depending arms, replacing the ordinary artillery wheels, which have portions journaled on the bearing of the gun axle and carrying wheel axles below the gun axle for the reception of interchangeable rubber tired wheels, with mechanism for yieldingly supporting the wheel axle in any position of the gun, without in any way interfering with the gun equipment possessed by the guns of the type referred to, which provides, among other things, for:

A. All parts necessary for travel, replacement, and firing are parts of the adaptors.

B. Wheels and tires are used commercially and are quickly removed and replaced.

C. Towing speed of 60 miles per hour or faster depending upon the prime mover.

D. Capable of being man-handled by a small crew up a slope on account of having brakes operating on each wheel separately. One side can be locked while the other wheels is moved over an obstacle or rough place, and then locked and the other wheel moved over.

E. 75 m/m with the high speed adaptors is always ready for action and for march order.

F. Rapid crank traverse is made possible for the simple reason that there is no binding or strain or weight on the gun axle key-way, thereby allowing the gun to be traversed very easily and freely.

G. Having better stability for fire at fast moving targets for reason that one wheel can be locked by individual operating brakes allowing the gun to pivot on one wheel and the other to move around on circle.

H. Having better stability for firing on account of brake equipment locking both wheels and not allowing gun to pull forward on the counterrecoil.

I. Quick replacement of entire assembly or any part thereof.

J. No part is keyed or attached to the sliding gun axle, axle housing, or any parts that will permit or cause any strain or twist to the gun axle keyway.

K. The lateral sliding movement of the gun barrel and the protecting shield are not interfered with in any way.

L. Brakes are provided, using the late model standard Ford brakes. These brakes can be applied together or separately if desired in handling the gun.

M. Easily and quickly installed on guns in the field, and not necessary to drill any holes or change any parts of the standard French 75 m/m gun.

N. Very light and flexible.

O. Low in cost.

P. Weight of the gun carriage is not materially increased as the combined weight of the substituted parts is not substantially greater than the weight of the artillery wheels.

Q. Installation without any changes whatsoever to the standard gun carriage can be made in the field when necessary.

A further object of the invention is to provide a resilient mechanism connected to the trail of the gun which will maintain the wheels in alignment and below the gun axle and which will remain stationary with respect to the gun axle when the gun is traversed.

A still further object of the invention resides in the provision of suitable braking mechanism for controlling the gun during high speed transport and for assisting in the placement and maintenance of the gun in firing position, the braking mechanism being so arranged and positioned as not to interfere with the firing of the gun and being capable of being used as firing brakes to prevent the movement forward as the counterrecoil.

A still further object of the invention is to provide braking mechanism designed to operate independently on each wheel for the purpose of zig-zagging the gun up a hill over rough ground and over obstacles and also for pivoting on one locked wheel to prevent the gun from running out of control down a grade and for pivoting on one wheel for firing at a moving target permitting the trail to be moved around, pivoting on the wheel either right or left, which gives an approximate true firing arc when firing at a moving object.

Many other important advantages and features of this invention will be apparent to those skilled in the art from a reading of the following specification, in conjunction with the drawings attached hereto, in which;

Figure 2 is a side elevation of the gun and carriage with one wheel removed;

Figure 3 is a section on line 3—3 of Figure 1;

Figure 4 is a detail of the compensating shaft assembly shown in plan view;

Figure 5 is a side elevation of the parts shown in Figure 4;

Figure 6 is a section through the compensating shaft and mounting taken on line 6—6 of Figure 4;

Figure 7 is a detail plan of the brake mechanism;

Figure 8 is an elevation of the part shown in Figure 7;

Figure 9 is a section on the line 9—9 of Figure 7; and

Figure 10 is a detailed view showing the different positions the arms assume when firing and towing respectively.

Figure 1:
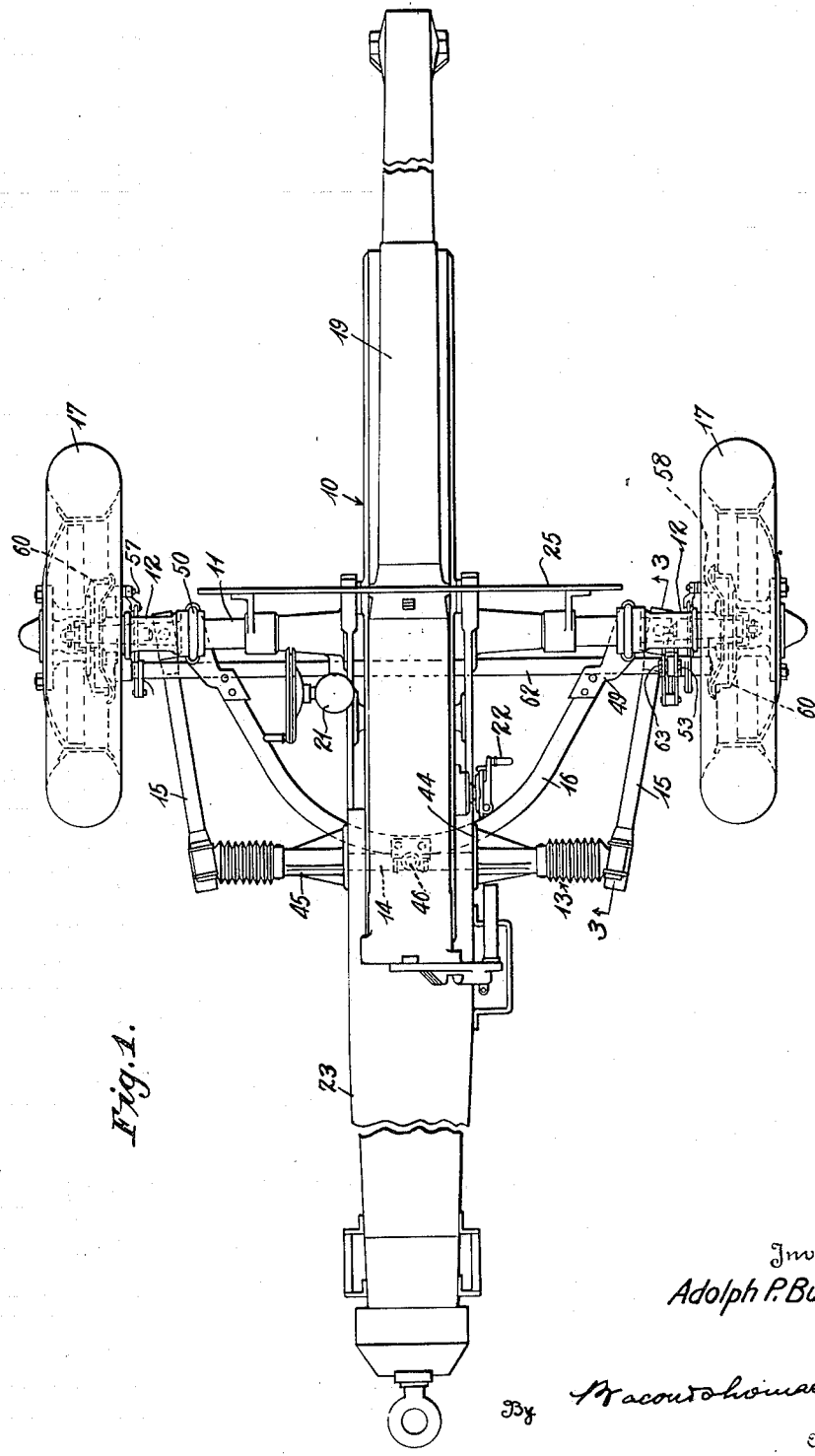
Figure 1 is a plan view of the gun showing the improved gun carriage with parts broken away.

Referring more particularly to the drawings, 10 indicates in general the gun and trail assembly; 11 indicates the gun axle; 12 indicates the depending arms on which the wheel axles are mounted; 13 indicates in general the depending arm supporting mechanism which includes the compensator shaft 14, radius rods 15 and a wishbone device 16; 17 indicates the rubber tired wheels mounted upon the wheel axles and 18 indicates in general the brake mechanism.

The gun and trail assembly includes the usual gun barrel 19 provided with the usual recoil mechanism 20, traverse mechanism 21 and elevating mechanism 22, all of which is mounted upon a trail 23 provided with the usual spade 24. This assembly is mounted for lateral sliding movement upon the gun axle 11 and carries with it the usual gun shield 25.

In applicant's improved device the usual artillery wheels are removed and replaced by the depending arms 12 which have a hub portion 26 adapted to fit over the bearings on the ends of the gun axle 11 to provide for oscillation of the depending arms about the gun axle. The depending arms 12 are further provided with bores 27 adapted to receive studs shafts 28 which extend laterally outwardly from the depending arms to form axles 29 upon which wheels 17 are mounted by anti-friction bearings 30. It will be noted that the wheel axles 29 are parallel to and spaced from the gun axle 11 and are positioned below the gun axle in all positions of the gun. The depending arms 12 are provided with studs 31 below the wheel axles. These studs extend laterally inwardly from the depending arms and are provided at their innermost extremities with balls 32. The balls 32 are adapted to receive one end of radius rods 15 which extend rearwardly to the compensating shaft 14. The ends of the compensating shaft 14 are also provided with balls 33 adapted to receive the other ends of the radius rods 15. As shown in Figure 3, the radius rods 15 are provided at the ends which receive the balls 32 on the depending arms 13 with bores 34 adapted to receive bearing blocks 35 and 36 engaging the surface of the balls 32 upon opposite sides thereof. The bearing blocks 35 are urged outwardly of the bores against the balls 32 by springs 37 and the bearing blocks 36 are retained in the bores by means of screw threaded plugs 38. The other ends of the radius rods are also provided with bores 39 in which bearing blocks 40 and 41 are positioned to bear upon opposite sides of the balls 33. The inner bearing blocks 40 abut the inner ends of the bores 39 while the bearing blocks 41 are resiliently urged against the balls 33 by the springs 42. The springs 42 are retained within the bores 39 by screw threaded plugs 43 forming abutments for the springs 42.

Brackets 44 are rigidly mounted upon the trail 43 and are provided with bearings 45 to receive the compensating shaft 14 which extends below the gun trail. Bearings 45 permit the gun trail to move laterally with respect to the compensating shaft 14, which shaft is constrained to remain in a fixed position with respect to the gun axle when the gun is traversed to the right or left. As shown in Figure 6, the shaft 14 is provided with a stud 46 extending vertically therethrough and provided with a ball 47 positioned below the compensating shaft 14. The wishbone device 16 is provided with a bearing socket 48 which surrounds the ball 47 for universal movement. The ends of the wishbone device are provided with brackets 49 which are rigidly attached to the gun axle by means of U-bolts 50. To prevent grit and other abrasives from entering the bearings 45, flexible bellows are positioned around the exposed ends of the shaft 14 and the rear ends of the radius rods 15 so as not to interfere with the lateral sliding of the shaft 14 or the universal movement of the radius rods 15 with respect to the shaft 14. It will be seen from the above description of the wheel axle supporting mechanism, that the gun may be traversed so as to slide upon the gun axle without changing the relative position of the wheels and that the axles of the wheels will at all times remain parallel to the gun axle. When the gun is constrained to slide along the gun axle in traversing, the wishbone device 16 acting through the ball 47 causes the compensating shaft 14 to remain fixed in position with respect to the gun axle 11. It will thus be seen that there is no tendency to vary the distance between the balls 33 upon the compensating shaft and the balls 32 upon the depending arms 12 and that the relative positions of the wheels with respect to the gun axle are not disturbed in traversing the gun.

As shown in Figure 2, the depending arms 12, when the gun is in firing position, are arranged such that the wheel axles 29 are positioned below the gun axle and forwardly thereof. When the gun is fired, the reaction to discharge of the projectile has a vertical component tending to raise the gun and carriage from the ground. Because of their weight, the wheels and parts supported thereby tend to resist this movement and in applicant's device the resisting force compresses the spring 37 allowing the depending arms to oscillate slightly in a rearward direction so that the wheel axis approaches a position more nearly below the gun axle. That is, some of the normal upward movement of the gun carriage is taken care of by the increased vertical distance between the gun axle and the wheel axle and also the tires are effective to allow some upward movement of the gun carriage before the wheels leave the ground. Also some of the energy of the vertical component of the gun's reaction is absorbed in compressing the spring 37, such that the movement is to some extent prevented. As will be apparent applicant's device produces a gun carriage of adequate stability in firing, accuracy and ease of handling, because of the reduction in the tendency of the wheels to leave the ground, and therefore obviates the necessity of resighting after firing.

The movement past the original position of the gun is resisted by the springs 43 on the other ends of the radius rods 15 and the energy of this movement absorbed by the spring and sliding bearing 44 as well as by the rubber tires. Continued oscillation of the gun in an upward direction is damped over that which would take place, were rubber tires used without applicant's resilient supporting device for the wheel axles.

It will be noted that when the trail 23 is lifted to transport position, the wheel axle 29 will be positioned slightly forward of the gun axle. In this position the vertical stresses due to road shocks are absorbed by the tires in combination with the oscillating movement of the depending arms, which are forward of the gun axle through the radius rod springs.

It is pointed out that none of the mechanism above described in any way interferes with the operations necessary to fire the gun. The gun may be traversed as readily as is the case when the usual artillery wheels are used and none of the mechanism in any way modifies or interferes with the gun elevating device. Furthermore, the freer wheeling of the gun carriage enables the gun to be placed in position and its position changed with the use of less man-power than is the case where artillery wheels are used.

Applicant has also provided a braking means for the rubber tired wheels in order to adapt the gun for high speed transport and to aid in maneuvering the gun into firing position. The depending arms 12 are provided with bearings 51 upwardly and rearwardly from the wheel axis 29 in which a supporting shaft 52 is mounted to extend between the depending arms upon opposite ends of the gun axle. The supporting shaft 52 is mounted in the bearings 51 with sufficient flexibility to permit limited independent movement of the depending arms 12. A brake lever 53 is positioned adjacent the depending arm 12 at one side of the gun carriage and is journaled upon the shaft 52. This brake lever has a depending portion 54 projecting below the shaft 52 and is connected by means of a link 55 to a lever arm 56 rigidly secured to a brake operating cam shaft 57 journaled in a brake supporting plate 58 mounted upon the depending arm 12 and concentric with the wheel axis. Rotation of the cam shaft 57 is effective to force internal brake shoes 59 against the internal surface of a brake drum 60 carried by the wheel hub 61 by means of a cam mechanism not shown. A tubular member 62 surrounds the brake supporting shaft 52 and has a lever 63 rigidly connected thereto and positioned adjacent and coaxially with the lever 53. The other end of the tube is provided with a collar 64 carrying a lever arm 65 depending below the shaft 51. This depending lever arm 65 is connected by means of a link 55 and lever arm 56 to a brake mechanism exactly similar to that above described with respect to the lever 53.

Ratchet segments 66 are mounted on the depending arm 12 by suitable bolts and are adapted to be engaged by ratchets 67 pivotally mounted upon the levers 53 and 63 and adapted to be actuated by the manually operable latch lever 68 pivotally mounted upon the upper end of the levers 53 and 63 and connected to the ratchet 67 by the rods 69.

It will be thus seen that I have provided independently operative brakes, which are adapted for high speed transport and which may be used to brake either of the wheels at the option of the operator. It is also to be noted that the brake levers 53 and 63 are positioned closely adjacent each other such that the two levers may be easily operated simultaneously. This arrangement provides a device by which one of the wheels may be locked while the other wheel is swung around the locked wheel as a fixed pivot to assist in placing the gun for firing and which allows both of the wheels to be locked for firing purposes as well as providing braking for stopping the progress of the gun while being transported.

As will be observed from the diagrammatic view shown in Figure 10, the stub axles secured to the depending arms are positioned approximately three-fourths of an inch forwardly of the gun axle when in transporting position whereby to permit yieldably resisted oscillation of the depending arms thereby to minimize pounding, road shocks and wear and tear on gun equipment during transportation. This off-set relationship of the stub axles is automatically increased to approximately three inches when the trail is lowered and embedded in the ground when firing.

This application is a continuation in part of my copending applications Serial No. 621,726 and Serial No. 621,727, both filed July 9, 1932.

While I have described the preferred embodiment of my invention, it is understood that many changes in construction and arrangement of parts may be made without departing from the spirit of my invention, as defined in the following claims:

I claim:—

1. A gun carriage of the character described adapted to support a gun and gun trail, comprising an axle upon which the gun is adapted to slide in traversing the gun, depending members journaled upon opposite ends of the gun axle, wheel axles carried by said depending members and adapted to receive interchangeable wheels, a device connected to the depending members for maintaining the wheel axles below the gun axle, said device including a shaft upon which the gun trail is slidably mounted, and means to maintain said shaft stationary with respect to the gun axle.

2. Means for converting a horse-drawn gun carriage of the two-wheeled artillery type including a gun axle, into a rubber tired carriage for being towed at high speed and for supporting the gun while being fired, said means comprising depending arms for replacing the relatively large artillery wheels upon the gun axle and carrying wheel axles below the gun axle to receive smaller rubber tired wheels without changing the height of the gun axle, and radius rods extending rearwardly from the depending arms and connected to the gun trail to retain the wheel axles below the gun axis, said radius rods having means to absorb rebound during firing of the gun.

3. A device for converting a horse-drawn gun carriage of the artillery wheeled type having a gun axle, into a rubber tired gun carriage for being towed at high speed and for supporting the gun while being fired, said device comprising depending units for replacing the artillery wheels upon the gun axle and carrying wheel axles below the gun axle, and means connected to the depending units for resiliently maintaining the wheel axles below the gun axle and constructed and arranged to compensate for rebound from said rubber tires during firing of the gun.

4. A gun carriage adapted to support a gun assembly including a gun and gun trail, said carriage comprising an axle upon which the gun assembly is adapted to slide when the gun is traversed, depending arms journaled upon the opposite ends of said gun axle for independent rotation and carrying wheel axles spaced from the gun axle, means connected to said depending arms for retaining the wheel axles below the gun axle, said means including a stationary shaft upon which the gun assembly is slidably mounted and radius rods connecting said depending arms and said shaft.

5. A gun carriage adapted to support a gun and gun trail, an axle upon which the gun is adapted to slide when the gun is traversed, wheel axles spaced from the gun axle and carried by members journaled upon the gun axle for independent rotation, means to limit the rotation of said members including a shaft upon which the gun trail is slidably mounted and means to maintain said shaft stationary with respect to the gun axle when the gun is traversed.

6. A gun carriage adapted to support a gun and gun trail, an axle upon which the gun is adapted to slide when the gun is traversed, wheel axles spaced from the gun axle and carried by members journaled upon the gun axle for independent rotation, means to limit the rotation of said members including a shaft slidably mounted upon the gun trail and means to maintain said shaft stationary with respect to the gun axle when the gun is traversed, said last named means comprising a wishbone member extending between said shaft and the ends of the gun axle.

7. A gun carriage adapted to support a gun assembly including a gun and gun trail, said carriage comprising an axle upon which the gun assembly is mounted depending arms journaled upon opposite ends of said axle for limited independent rotation, said arms being provided with wheel axles below the gun axle to receive wheels having resilient tires, and means to limit the rotation of said depending arms, said last named means including means for absorbing rebound from the resilient tires during firing of the gun.

8. A gun carriage adapted to support a gun assembly including a gun and gun trail, said carriage comprising an axle upon which the gun assembly is mounted, depending arms journaled upon opposite ends of said axle for limited independent rotation, said arms being provided with wheel axles below the gun axle, and means to limit the rotation of said depending arms, said last named means including a stationary shaft upon which the gun assembly is slidably mounted and radius rods resilient connecting said depending arms and said shaft.

9. A gun carriage adapted to support a gun assembly including a gun and gun trail, said carriage comprising an axle upon which the gun assembly is mounted, depending arms journaled upon opposite ends of said axle for limited independent rotation, said arms being provided with wheel axles below the gun axle, and means to limit the rotation of said depending arms, said last named means including a shaft carried by said gun trail and maintained stationary with respect to said axle radius rods extending rearwardly and connected to the stationary shaft, said radius rods being universally and resiliently connected to said depending arms and stationary shaft.

10. A gun carriage adapted to support a gun assembly including a gun and gun trail, said carriage comprising an axle upon which said gun assembly is adapted to slide when the gun is traversed, depending arms journaled upon opposite ends of the gun axle for independent rotation, said arms being provided with wheel axles spaced from the gun axle, a shaft upon which the gun assembly is adapted to slide, means to maintain said shaft stationary with respect to said gun axle when the gun is traversed, and radius rods resiliently connecting said depending arms and the ends of said shaft to maintain the wheel axles below said gun axle.

11. A gun carriage for a gun assembly including a gun trail, said carriage comprising a shaft upon which said gun assembly is slidably mounted, depending members mounted upon said shaft and carrying wheel axles below said shaft, and means for maintaining said wheel axles below said shaft including a second shaft upon which said gun assembly is adapted to slide.

12. A gun carriage for a gun assembly including a gun supporting member and a gun trail, said carriage comprising a shaft upon which said assembly is slidably mounted, depending arms mounted upon the ends of said shaft, axles carried by said arms below said shaft, wheels journalled upon said axles, means for maintaining said axles below said shaft, said means including a second shaft upon which said gun assembly is adapted to slide.

13. A gun carriage for a gun assembly including a gun trail, said carriage comprising a gun axle upon which said assembly is slidably mounted, depending members mounted upon the ends of said axle, replaceable stub axles mounted in said depending members below said gun axle, wheels journalled upon said stub axles, and means to hold said depending members in depending position, said means including a second shaft upon which said gun assembly is adapted to slide.

14. In a gun carriage of the artillery wheel type including a gun supporting structure provided with a trail having an end adapted to be embedded in the ground, means for substituting for the relatively large size artillery wheels smaller rubber tired wheels for adapting the gun carriage for high speed work and without changing the height of the gun, and means interposed between the gun supporting structure and said rubber tired wheels and constructed and arranged to substantially reduce rebound from the rubber-tired wheels to provide for repeated firing directly from the rubber tired wheels.

15. Means for converting a horse drawn gun carriage of the two artillery wheel type having a gun supporting structure including a gun axle into a high speed gun carriage comprising adapters for engaging the extremities of the gun axle in lieu of the artillery wheels originally placed thereon, said adapters provided with depending arms adapted to receive stub axles for smaller size rubber tired wheels without changing the height of the carriage, and means interposed between said gun supporting structure and said rubber tired wheels constructed and arranged to substantially reduce rebound from the rubber tired wheels to provide for firing directly from said rubber tired, smaller size substituted wheels.

16. A gun carriage of the slow-moving two wheel artillery type having a stationary axle and a gun trail having an end adapted to be embedded into the ground when firing, means for converting the gun carriage into a high speed gun carriage, said means comprising adapters secured to the extremities of said stationary axle in substitution of the artillery wheels originally placed thereon, said adapters carrying interchangeable demountable rubber tired wheels of relatively small size and providing for maintaining the axles thereof in a position below the stationary gun axle, and rebound absorbing means constructed and arranged to provide for firing directly from said rubber tires, said last named means providing limited rotation of said adapters on said stationary axle during recoil.

17. A gun carriage of the slow-moving two wheel artillery type having a stationary axle and a gun trail having an end adapted to be embedded into the ground when firing, means for converting the gun carriage into a high speed gun carriage, said means comprising adapters secured to the extremities of said stationary axle in substitution of the artillery wheels originally placed thereon, said adapters carrying interchangeable demountable rubber tired wheels of relatively small size and providing for maintaining the axles thereof in a position below the stationary gun axle, means constructed and arranged to provide for firing directly from said rubber tires and means for providing limited rotation of said adapters on said stationary axle during recoil, said last-named means comprising resilient connections between the gun carriage and the adapters.

18. In a gun carriage normally provided with artillery wheels, an adapter for substituting resiliently tired wheels for said artillery wheels, said adapter being provided with means compensating for rebound from the resiliently tired wheels to provide for firing said gun while supported by said resiliently tired wheels.

19. In a gun carriage normally provided with artillery wheels, an adapter for substituting resiliently tired wheels of smaller size than said artillery wheels for said artillery wheels, without changing the height of the gun, said adapter being provided with means compensating for rebound from the resiliently tired wheels, to provide for firing said gun while supported by said resiliently tired wheels.

20. A gun and carriage assembly providing for the firing and rapid transportation of said gun comprising a gun supporting structure including a gun trail and wheels carrying said structure and having resilient tires forming the sole supports for said gun while being fired, said assembly having resilient means between said structure and wheels constructed to absorb rebound from said resilient tires during firing of the gun.

ADOLPH P. BUQUOR.